H. W. MILLER.
STALK CUTTER.
APPLICATION FILED DEC. 26, 1911.
1,034,392.
Patented July 30, 1912.
2 SHEETS—SHEET 2.
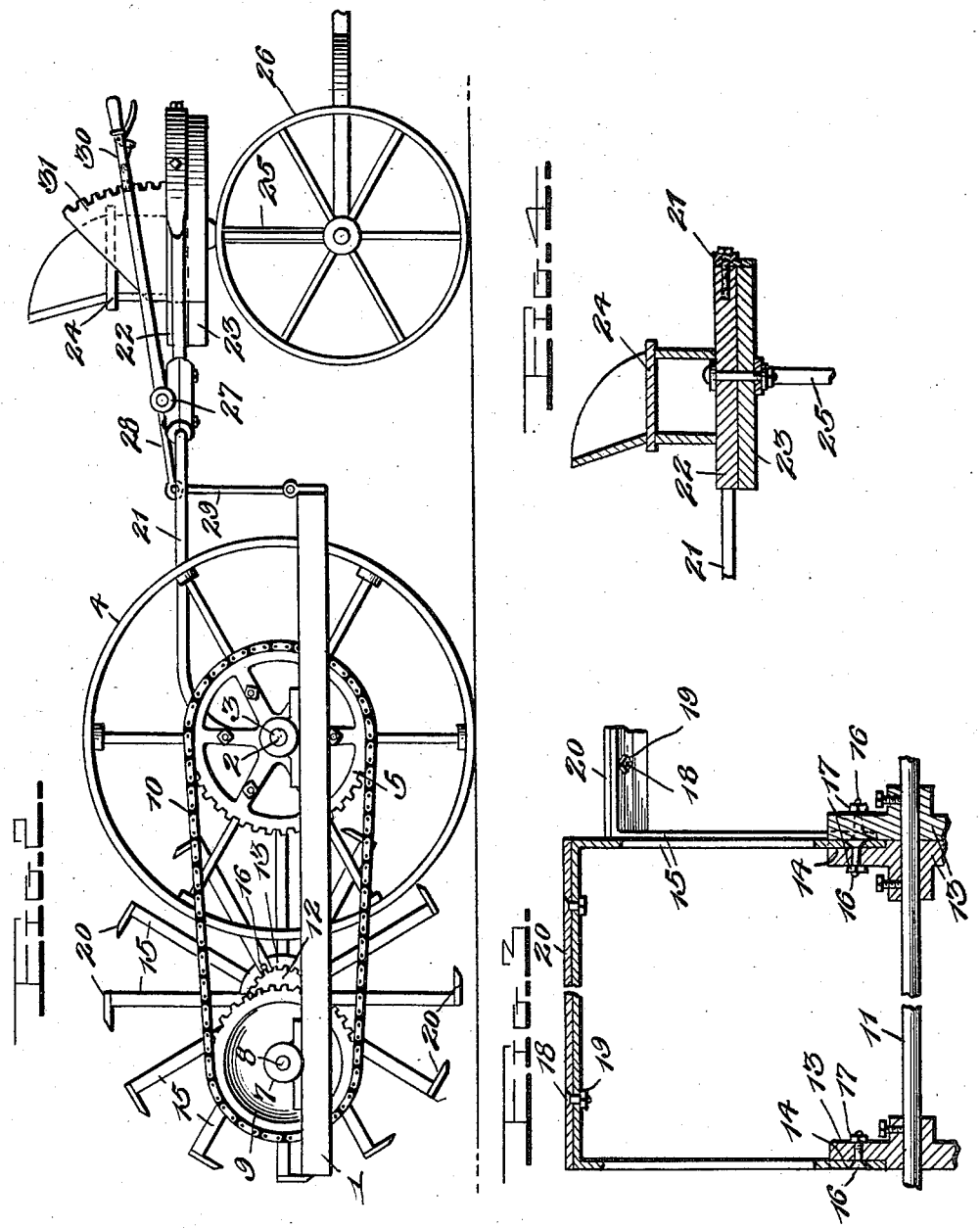
Witnesses
Chas. L. Griesbauer.
G. B. Norton.
Inventor
Henry W. Miller,
By Watson E. Coleman.
Attorney

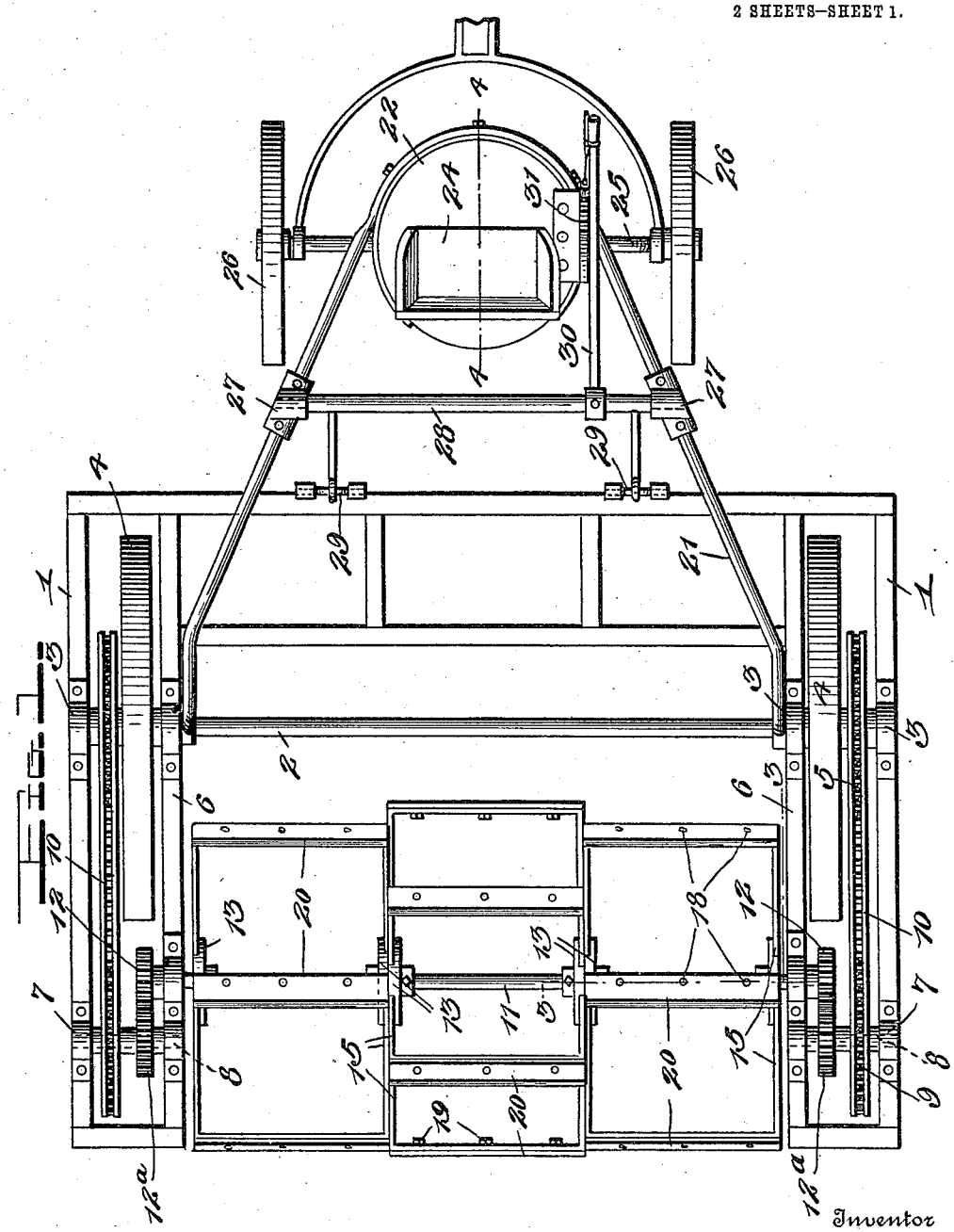

UNITED STATES PATENT OFFICE.

HENRY W. MILLER, OF RITZVILLE, WASHINGTON.

STALK-CUTTER.

1,034,392.  Specification of Letters Patent.  Patented July 30, 1912.

Application filed December 26, 1911. Serial No. 667,721.

*To all whom it may concern:*

Be it known that I, HENRY W. MILLER, a citizen of the United States, residing at Ritzville, in the county of Adams and State of Washington, have invented certain new and useful Improvements in Stalk-Cutters, of which the following is a specification, reference being had to the accompanying drawings.

My invention relates to new and useful improvements in agricultural field implements and more particularly to a stalk cutter designed especially to cut corn stubble and the like and mow weeds from the soil when preparing the ground for seeding, and my object is to provide a device of this character which is simple and durable in construction, inexpensive to manufacture, and one which is very efficient in operation.

A further object of the invention resides in providing a device of this character with a reel having improved means for carrying the knives or cutters thereon, and a still further object resides in providing means for the operation of the reel from the driving wheel of the device.

Another object of the invention resides in providing means whereby the frame carrying the reel may be raised and lowered to any degree to permit the knives on the reel to engage the soil to various depths.

With these and other objects in view, my invention consists in the novel features of construction, combination and arrangement of parts as will be hereinafter referred to and more particularly pointed out in the specification and claims.

In the accompanying drawings forming a part of this application, Figure 1 is a top plan view of the device. Fig. 2 is a side elevation thereof with the wheel nearest the observer removed. Fig. 3 is a transverse section through the device as seen on line 3—3, Fig. 1, and, Fig. 4 is a section through the seat as seen on line 4—4, Fig. 1.

In carrying out my invention, I shall refer to the drawings in which similar reference characters designate corresponding parts throughout the several views and in which 1 indicates a frame of the usual or any preferred type used in agricultural implements of this type upon which is mounted a shaft or axle 2, said shaft or axle extending transversely of the frame and being held in position by means of the bearings 3, and rotatably mounted on said shaft or axle 2 immediately adjacent its ends and within the side bars of the frame, are the driving and supporting wheels 4, each of which driving wheels is provided thereon with a sprocket 5. Extending longitudinally of the frame 1 and spaced from each of the side rails of said frame, is a bracing beam or rail 6, and rotatably mounted in bearings 7 carried in alinement with one another on the side rails of the frame and said bracing rail 6, are the transverse stub shafts 8, each of which stub shafts is disposed immediately in the rear of a supporting wheel and carries thereon, a sprocket wheel 9 arranged in alinement with the adjacent sprocket wheel 5 on the driving wheel. Extending over the sprockets 5 and 9, are the chains 10, whereby it will be appreciated that as the driving wheels 4 are rotated, the shafts 8 will be rotated to correspondingly rotate any means that may have connection with said shafts.

Rotatably mounted on the supporting or bracing beams 6, is an additional shaft 11 which has mounted on each end thereof, a pinion 12, while each of the stub shafts 8 is also provided with a pinion 12$^a$ in mesh with the pinions 12, so that as the device is propelled, it will be appreciated that the shaft 11 with all parts which may be carried thereon, will be rotated. This shaft 11 forms the central shaft or core of a reel which is formed by providing a plurality of disk members 13, each of which is clamped to the shaft 11 so as to rotate therewith, with the intermediate disks arranged contiguous or in contact with one another. These disks 13 are arranged in pairs on the shaft, the disks of each pair being spaced the same distance apart, and the outer faces of the disks 13 are provided with a plurality of radial channels or slots 14 in which are disposed the free ends of the arms of a plurality of substantially U-shaped metallic frame sections 15. The ends of these frame sections are secured to the disks by means of the bolts 16 and nuts 17, whereby the same may be readily removed, when desired, and it will be appreciated that the arms of the frame sections will be countersunk in the disks, the purpose of which will be hereinafter and more particularly described. Removably secured to the outer or horizontal portions of each of the frame sections 15 by means of the bolts 18 and nuts 19, are the cutters or blades 20, whereby as the shaft 11 is rotated, it will be seen that the cutters carried on the frame sections will be adapted for engagement with the soil to remove all growing matter in the path thereof.

As stated above, the intermediate disks of the reel are adapted to be brought contiguous with one another, and it will be appreciated that the outer faces of the opposed intermediate disks may be brought in actual contact with one another, which is most preferable, in view of the fact that the arms of the frame sections are countersunk in said faces. In the drawings, I have shown these intermediate disks in actual contact with one another, and the same are so positioned on the shaft as to dispose the cutters or blades of one series in staggered relation with respect to the cutters or blades of the adjacent series, whereby the ground to the width of the reel, itself, will be thoroughly and effectively engaged by these cutters or blades.

A pair of arms 21 having their inner ends loosely mounted on the shaft or axle 2, have their outer ends extended beyond the forward end of the frame 1 and secured to a frame or supporting plate 22 which carries thereon, the fifth wheel 23 and has mounted on the upper face of the same, a seat 24. The fifth wheel carries thereon the arched axle 25 which has mounted adjacent its ends, the front supporting wheels 26, whereby it will be appreciated that the frame will be properly supported and capable of propulsion. The arms 21 have mounted thereon immediately in the rear of the seat 24, the bearings 27, between which is oscillatingly mounted a U-shaped frame 28, the arms of which are pivotally connected to the front rail of the frame 1 by means of the substantially U-shape linking member 29. This frame 28 is provided with a lever arm 30 which is disposed outwardly toward the side of the seat 24, whereby the same may be readily grasped by the driver of the machine, and it will be appreciated that when moved in one direction, the forward end of the frame 1 will be forced downwardly to cause the rear end carrying the reel to be raised, and when said lever is disposed in an opposite direction, the opposite will be true. Thus, the rear end of the frame 1 may be adjusted so as to permit the cutters or blades 20 to engage the soil to a greater or lesser depth, and in order to retain the frame in any one adjusted position, I have provided a rack 31 in the side rail of the seat 24, the teeth of which are adapted to be engaged by a spring detent carried on the lever 30. Thus, the frame 1 may be held in any desired position to permit the cutters or blades 20 to engage the soil at the required depth, and while I have not so shown the same, any desired form of draft attaching means may be provided in connection with the arched front axle 25.

In operation, it will be seen that the driver of the device may throw the lever 30 in such a position as to entirely raise the reel from any possible engagement with the ground, whereby the device may be driven to the desired portion of the field to be cultivated. When this portion of the field has been reached, the lever 30 may be again adjusted to permit the rear end of the frame to be lowered and correspondingly allow the cutters on the reel thereon to engage the soil to any desired depth, and when the adjustment of this desired depth has been obtained, the same may be retained by the engagement of the detent 32 with the rack 31. By then driving the device forwardly, it will be seen that the soil will be removed of all stalks, weeds and the like to the full width of the reel and the complete field may be covered in this manner.

From the foregoing, it will be seen that I have provided a simple, inexpensive and efficient device for carrying out the purposes of the invention, and while I have particularly described the elements most well adapted to perform the functions set forth, it is obvious that various changes in form, proportion and in the minor details of construction may be resorted to without departing from the spirit or sacrificing any of the principles of the invention.

Having thus described my invention, what I claim is:—

1. In a stalk cutter, the combination with a main frame, and supporting wheels therefor; of a reel on said frame comprising a shaft rotatably mounted on the frame, a plurality of disk sections adjustably mounted on said shaft and arranged in pairs thereon, a plurality of frame sections carried by each pair of disks, and a plurality of blades carried by said frame sections.

2. In a stalk cutter, the combination with a main frame, and supporting wheels therefor; of a reel on said frame comprising a central shaft rotatably mounted on the frame, a plurality of disks adjustably mounted on said shaft and arranged in pairs thereon, a plurality of frame sections removably engaged with each pair of disks, and a cutting blade removably carried on each of said frame sections.

3. In a stalk cutter, the combination with a main frame, and supporting wheels therefor; of a reel for the frame comprising a central shaft rotatably mounted on said frame, a plurality of disks adjustably mounted on said shaft and arranged in pairs thereon, a plurality of U-shaped frame sections, the free ends of the arms of which are removably engaged with the outer faces of said disks, and cutting blades carried on the horizontal or base portions of said frame sections.

4. In a stalk cutter, the combination with a main frame, and supporting wheels therefor; of a reel on said frame comprising a central shaft rotatably mounted on the frame, a plurality of disks adjustably mounted on said shaft and arranged in pairs thereon, a plurality of U-shaped frame sections, the free ends of the arms of which are removably engaged with the outer faces of each pair of disks, the frame sections of each pair of disks being arranged in staggered relation with respect to the frame sections of the adjacent pair of disks, and a cutting blade removably secured to the base or horizontal portion of each frame section.

In testimony whereof I hereunto affix my signature in the presence of two witnesses.

HENRY W. MILLER.

Witnesses:
W. H. MARTIN,
FRED SIEGEL.

Copies of this patent may be obtained for five cents each, by addressing the "Commissioner of Patents, Washington, D. C."